United States Patent [19]

Burke

[11] 3,872,060

[45] Mar. 18, 1975

[54] METHOD OF SULFOALKYLATING POLYHYDRIC ALCOHOLS AND THE CORRESPONDING PRODUCT

[75] Inventor: Noel I. Burke, Danville, Ill.

[73] Assignee: Tee-Pak, Inc., Chicago, Ill.

[22] Filed: Oct. 4, 1973

[21] Appl. No.: 403,346

[52] U.S. Cl....260/79.3 R, 260/91.3 VA, 260/209 R, 260/215, 260/456 R
[51] Int. Cl....... C08b 3/00, C08b 9/00, C08f 27/06
[58] Field of Search.......... 260/79.3 R, 215, 456 R, 260/91.3 VA, 209 R

[56] References Cited
UNITED STATES PATENTS

| | | | |
|---|---|---|---|
| 3,072,618 | 1/1963 | Turbak........................... | 260/79.3 R |
| 3,072,703 | 1/1963 | Turbak............................. | 260/985 |
| 3,168,547 | 2/1965 | Turbak............................ | 260/214 |
| 3,609,377 | 9/1971 | Pettitt et al........................ | 260/215 |
| 3,689,466 | 9/1972 | Bridgeford et al............ | 260/79.3 R |
| 3,709,877 | 1/1973 | Tunc................................ | 260/232 |

Primary Examiner—Ronald W. Griffin
Attorney, Agent, or Firm—Russell L. Brewer; Neal J. Mosely

[57] ABSTRACT

The present invention relates to a method for forming a sulfoalkylated ester of a polyhydric alcohol and the corresponding product. The process comprises reacting a polyhydric alcohol with a sulfur trioxide-organophosphorus complex which contains from about 0.1–0.8 moles of sulfur trioxide per mole of organophosphorus compound. The sulfur trioxide-organophosphorus complex is used in a proportion sufficient to provide at least about 50 mole percent sulfur trioxide in excess of that stoichiometrically required to form the desired ester.

20 Claims, No Drawings

METHOD OF SULFOALKYLATING POLYHYDRIC ALCOHOLS AND THE CORRESPONDING PRODUCT

DESCRIPTION OF THE PRIOR ART

In the past, there have been several processes developed which employ sulfur trioxide complexes for the manufacture of sulfates of polyhydric alcohols. Additionally, the sulfur trioxide complexes have been used for forming sulfonates of unsaturated hydrocarbons. Such sulfates and sulfonates have found use in the detergent field, as thickeners for aqueous systems, as sizes for textiles, as adhesives, and as soil conditioners.

As noted in the prior art, considerable difficulty was encountered in the processes used for forming sulfates of polyhydric alcohols. For example, one early process employed a dimethyl formamide-sulfur trioxide complex or a pyridine-sulfur trioxide complex to form esters of polysaccharides, e.g., cellulose. This process was extremely difficult to carry out as the reactants tended to degrade the polysaccharide and cause charring, particularly at high levels of substitution. Further, it was practically impossible to obtain a completely sulfated or sulfonated product.

A more recent process shows that sulfates of alcohols including polyhydric alcohols and polymeric alcohols could be produced by reacting an alcohol with a substantially stoichiometric quantity of sulfur trioxideorganophosphorus complex where the mole ratio of sulfur trioxide to organophosphate in the complex was from about 1:1 to about 3:1. By using this complex, under such appropriate conditions, sulfated polyhydric alcohols could be formed with very little degradation and charring.

Although both of these processes employ a complexing agent somewhat similar to the ones used in this invention in a reaction with a polyhydric alcohol, the product produced by the method disclosed herein is unlike that produced by prior art techniques. In this case, the product is a sulfoalkyl ester of a polyhydric alcohol as opposed to a sulfate, sulfonic ester, and sulfonate of a polyhydric alcohol.

SUMMARY OF THE INVENTION

This invention relates to a process for producing sulfoalkylated esters of polyhydric alcohols in contrast to the sulfates and sulfonic esters of alcohols and the sulfonates of unsaturated hydrocarbons. It also relates to a class of sulfoalkylated esters of polymeric polyhydric alcohols. The process comprises sulfoalkylating a polyhydric alcohol by reacting said polyhydric alcohol with a sulfur trioxideorganophosphate complex containing from about 0.1–0.8 moles of sulfur trioxide per mole of organophosphate wherein said complex is present in a proportion sufficient to provide at least about 50 mole percent sulfur trioxide in excess of that required to form the desired ester.

The product produced then, which constitutes an aspect of the invention, is a sulfoalkylated ester of a polyhydric alcohol. Preferred compositions are the substantially completely sulfoalkylated polysaccharides such as cellulose. The novel products formed by the process of this invention have a wide variety of uses. They can be used as alkylating agents in organic synthesis as the organic portion of the ester can be readily eliminated; they can be used as an acid catalyst as the esters can be hydrolyzed, in situ, to form said acid catalysts; they can be used in forming sulfates of polyhydric alcohols.

DESCRIPTION OF THE PREFERRED EMBODIMENT

The sulfur trioxide-organophosphate complex is prepared by contacting a trivalent or pentavalent phosphorus compound either in the presence or absence of an organic solvent with a composition having sulfur trioxide available.

Sulfur trioxide can be used as a free compound or in a loosely bound form from which it can be readily liberated when contacted with the phosphorus compound. For example, chlorosulfonic acid and fuming sulfuric acid are examples of compositions in which the sulfur trioxide can be liberated to form the complex. For purposes of this invention, it is possible to use not only the free sulfur trioxide compound in making the sulfur trioxide complex but also compositions in which the sulfur trioxide is loosely bound. The term "sulfur trioxide" is intended to include these latter compositions.

The organophosphorus composition may be trivalent or pentavalent and is represented by the formula below:

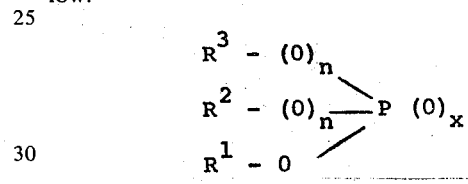

wherein $R^1$, $R^2$, and $R^3$ are hydrogen, aliphatic cycloaliphatic groups containing up to 18 carbon atoms provided that at least one of the $R^1$, $R^2$, or $R^3$ groups is organic, (O) is oxygen, $n$ is 0 or 1, $x$ is 0 or 1, and P is phosphorus.

The organic (R) groups designated $R^1$, $R^2$, and $R^3$ preferably should be nonreactive with the sulfur trioxide or sulfur trioxide liberating compound in forming the organophosphorus sulfur trioxide complex. If such organic groups are reactive with the sulfur trioxide, then the proportion of the organophosphorus-sulfur trioxide complex necessary for forming the sulfoalkylated polyol must be increased to provide for the desired proportion of reactive sulfur trioxide.

The groups $R^1$, $R^2$, and $R^3$ may be like or unlike radicals selected from the groups mentioned. Although the groups $R^1$, $R^2$, and $R^3$ can be hydrogen, at least one group in the complex must be organic. The groups $R^1$, $R^2$, and $R^3$ suited for forming the organo phosphorus composition preferably are the lower alkyl groups having from 1–18 carbon atoms. Of these, those having from about 1–6 carbon atoms in the structure are preferred. The groups $R^1$, $R^2$, and $R^3$ can also be cyclic provided that the groups are saturated. The presence of aromatic groups in the phosphorus complex often interferes with the formation of the sulfoalkylated ester of the polyol even though aromatic groups can be included in similar sulfur trioxide-phosphorus complexes for forming sulfates of polyhydric alcohols.

Examples of organophosphorus compounds which can be used to produce the desired complexes include phosphates, phosphites, phosphonates, and phosphinates, etc. Examples include $(C_2H_5O)P=O$, $(CH_3O)P=O$, $(nC_4H_9O)_3P=O$, $C_2H_5OP(OH)_2O$, $C_yC_6H_{11}OP(O)(OC_4H_9)_2$, $C_yC_6H_{11}OP(O)(OC_3H_7)_2$, cyC$_6$H$_{11}$OP(O)(OH)$_2$, (cyC$_6$H$_{11}$O)$_2$P(O)OCH$_3$, nC$_{18}$H$_{37}$OP(O)(OCH$_3$)$_2$, cyC$_6$H$_{10}$C$_{12}$H$_{22}$OP(O)-(OC$_2$H$_5$)$_2$, (C$_3$H$_7$O)$_3$P, (C$_2$H$_5$O)$_3$P, (CH$_3$O)P, (C$_2$H$_5$)$_2$POH, (CH$_3$O)$_2$POH, C$_2$H$_5$OP(OH)$_2$, CH$_3$-OP(OH)$_2$, cyC$_6$H$_{11}$OP(OC$_4$H$_9$)$_2$, (cyC$_6$H$_{11}$O)$_2$POCH$_3$, (cyC$_6$H$_{11}$O)$_2$POC$_2$H$_5$, (cyC$_6$H$_{11}$O)$_2$POH, cyC$_6$H$_{11}$OPOH, nC$_{18}$H$_{37}$OP(OC$_2$H$_5$), (nC$_{18}$H$_{37}$O)$_3$P, cyC$_6$H$_{10}$C$_{12}$H$_{22}$OP(OCH$_3$)$_2$, CH$_3$P(O)()C$_2$H$_5$)$_2$, CH$_3$P(O)OHOC$_2$H$_5$, C$_6$H$_{11}$P(O)(OC$_2$H$_5$)$_2$, C$_{18}$H$_{37}$P(O)-(OC$_2$H$_5$)$_2$, cyC$_6$H$_{11}$P(O)(OC$_2$H$_5$)$_2$, C$_2$H$_5$P(O)-(OC$_{18}$H$_{37}$)$_2$, C$_2$H$_5$P(O)(OcyC$_6$H$_{10}$C$_{12}$H$_{23}$)$_2$, etc. It is understood that some of the phosphites may rearrange to phosphonates in the presence of SO$_3$ but an SO$_3$ complex is still the end product.

The organophosphorus-sulfur trioxide complex having from about 0.1–0.8 moles sulfur trioxide per mole of organophosphorus compound can be prepared in the same manner used in preparing an organophosphorus-sulfur trioxide complex of a 1:1 to about 3:1 mole ratio of sulfur trioxide to organophosphorus compound. These latter complexes are known and a method for preparing such compounds is taught in U.S. Pat. No. 3,072,703. Such method is incorporated by reference.

Typically in such method the organophosphorus compounds are dissolved in an inert solvent such as carbon disulfide, ethylene dichloride, hexane, dichloroethane, chloroform, and the like and then the sulfur trioxide is added to the resulting mixture. The reaction for forming the complex is allowed to proceed at a temperature of about 25°–50°C. Sometimes, the complex can be formed in the absence of a solvent by exercising proper control of temperature. If a solvent is used, it is preferably removed from the complex prior to reaction with the alcohol for forming the sulfoalkylated ester.

The ratio of sulfur trioxide to organophosphorus composition is from about 0.1–0.8 moles sulfur trioxide per mole of organophosphorus compound and preferably from about 0.25–0.5 moles sulfur trioxide to organophosphorus compound. When the mole ratio of sulfur trioxide to organophosphorus compound exceeds about 0.8, the sulfates of the polyhydric alcohols often are formed rather than the sulfoalkylated esters. Further, there is a tendency of the sulfur trioxide-organophosphorus complex to char the polyhydric alcohol and thereby cause the formation of undesirable byproducts. This is particularly true where higher substituted, e.g., di- and tri-, esters are formed. When less than about 0.1 moles sulfur trioxide per mole of organophosphorus compound is used in forming the complex, the quantity of sulfur trioxideorganophosphorus complex used in forming the sulfoalkylated ester often becomes unmanageable. Further, insufficient sulfur trioxide usually is available to form the sulfoalkylated esters.

The alcohols which may be reacted with the sulfur trioxideorganophosphorus complex are those alcohols having two or more hydroxyl groups. The alcohols may be individual molecules or may be a polymer as for example polyallyl alcohol, cellulose, and polyvinyl alcohol. Such alcohols include glycols such as ethylene glycol, propylene glycol, 1,4 butanediol, 1-5 pentanediol, and so forth. Other monomeric polyhydric alcohols such as glycerol, sorbitol, mannitol, dulcitol, arabitol are also included. Examples of polymers include polyvinyl alcohol, polyallyl alcohol, starch, amylose, cellulose, alginate, and polyglycols such as polypropylene glycol and polyethylene glycol and ethoxylated alcohols such as ethoxylated glycerol and propylene glycol.

A particular polymeric polyhydric alcohol suited for practicing the invention is cellulose as it can be formed into the highly substituted sulfoalkylated ester (D.S. (degree of substitution) of 2 or greater) which then can be hydrolyzed and converted to a trisulfate salt which is useful as a compound for making a sugar substitute. The P.S. of the cellulose with respect to SO$_3$ content is generally about 3 in the reactions.

In forming the sulfoalkylated esters, the polyol is mixed with the sulfur trioxide-organophosphorus complex and reacted at a temperature from about −20° to about 100°C. and usually from a temperature of about 25°–50°C. The pressure for such reaction typically is from about 0.25–20 atmospheres but in most instances is atmospheric pressure.

The reaction is typically carried out in the absence of a solvent although one can be used. Generally where the polyhydric alcohol is soluble or swellable in the organophosphorus complex, as for example with cellulose, then a solvent is not needed. In fact, in the case of cellulose, the use of a solvent is detrimental as it usually interferes with the yield of ester. On the other hand, if the polyhydric alcohol is not soluble or swellable in the organophosphate complex as with polyvinyl alcohol interaction of the alcohol with the sulfur trioxide often does not occur and in these instances then the use of a solvent sometimes is preferred. Examples of solvent or liquid carriers include chlorinated hydrocarbons such as dichloromethane, dichloroethane, benzene; and aliphatic hydrocarbons such as pentane, hexane, octane, and the like.

The proportion of the sulfur trioxide used in the reaction is at least about 50 mole percent alcohol and typically from about 100–1,000 mole percent based on the polyhydric in excess of that stoichiometrically required to form the desired sulfoalkylated ester. Generally, where lower substitution of the polyhydric alcohol is desired, e.g., in the case of forming monosulfoalkyl esters of polyhydric alcohols as opposed to tri or tetraesters of such polyhydric alcohols it is possible to use a lower proportion of sulfur trioxide, e.g., from about 75–150% excess. On the other hand, where di- and tri-sulfoalkylated esters of the polyhydric alcohols is desired, a higher proportion of sulfur trioxide or from about 100–500% molar excess basis the moles of hydroxyl group to be esterified is used. This excess of sulfur trioxide used in forming the ester is in contrast to the stoichiometric requirement or slight excess of sulfur trioxide, e.g., 20%, required for producing the sulfates of polyhydric alcohols. As might be expected, then, with lower concentrations of sulfur trioxide the sulfates of the polyhydric alcohols are formed to the substantial exclusion of the sulfoalkyl esters. Thus, in most of the products produced even though the D.S. of the alcohol with respect to the sulfoalkylated ester is less than the theoretical maximum; the D.S. with respect to the sulfate however is substantially the theoretical maximum.

Basically, the polymeric compositions of the invention are represented by the formula:

Pol—[O—SO$_2$—OR]$_n$ wherein Pol represents the polymeric polyhydric alcohol backbone and R represents an alkyl or cycloaliphatic group having up to 18 carbon atoms and $n$ is a number up to the number of hydroxyl groups available for esterification.

A preferred sulfoalkylated polymeric polyhydric alcohol is cellulose wherein the cellulose ester has a degree of substitution of at least 2 and preferably 2.5. A sulfoethylated cellulose have a degree of substitution of 3 is represented by the formula:

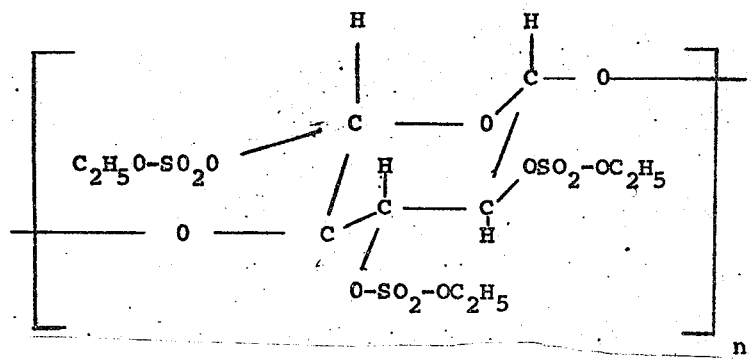

The following examples are intended to illustrate preferred embodiments of the invention and are not intended to restrict the scope thereof. All percentages are by weight.

EXAMPLE I

Preparation of Sulfur Trioxide-Triorgano Phosphorus Complex

A 1 mole portion of triethyl phosphate is added to a vessel equipped with an agitator. Then, 0.5 moles of sulfur trioxide is added under agitation over a 20 minute period. The rate of addition of sulfur trioxide is controlled in order to maintain the temperature between about 25° and 35°C. The reaction is highly exothermic and substantial cooling usually is necessary to maintain this temperature. Upon completion of the reaction, the temperature of the reaction product is reduced to about 25°C. A yellow-brown syrupy liquid is recovered.

EXAMPLE II

A sulfur trioxide-organophosphorus complex is prepared in exactly the same manner as the sulfur trioxide-triethyl phosphate complex of Example I except that dicyclohexylethyl phosphite is substituted for the triethyl phosphate.

EXAMPLE III

A sulfur trioxide-organophosphorus complex is prepared in exactly the same manner as the sulfur trioxide-triethyl phosphate complex of Example I except that ethyl dihydrogen phosphate is substituted for the triethyl phosphate used in Example I.

EXAMPLE IV

Sulfoethylated Ester of Ethylene Glycol

A 1 mole portion of ethylene glycol is charged to a vessel equipped with an agitator. Then, 2 moles sulfur trioxide in the form of the complex prepared in Example I is added to the vessel over a period of about one-half hour. Agitation is conducted throughout the addition of the complex. The temperature of the reaction mixture is maintained at about 35°–40°C. The reaction while maintained at this temperature is allowed to proceed for an additional 5 hours after the complete addition of the complex.

After completion of the reaction, methylene chloride is added to the product and extracted with water to remove excess reagent. The methylene chloride is dry and removed by heating on a steam bath and the resulting product dried in vacuum at 50°C. at 28 inches Hg. The ester content of the resulting sulfoethylated ethylene glycol is less than two indicating that complete esterification did not occur. On the other hand, those hydroxyl groups not sulfoalkylated are substantially completely sulfated.

When the above process is repeated using 4 moles SO$_3$ as complexed sulfur trioxide instead of 2 moles complexed sulfur trioxide-triethyl phosphate, substantially complete esterification of the ethylene glycol is obtained. This level of complex provides for 4 moles sulfur trioxide per mole of ethylene glycol or a 100% mole percent excess of the stoichiometric amount. The resulting esters are relatively insoluble in water but are soluble in hexane. On boiling the esters in water for about one hour, the products are substantially water-soluble indicating that the ester has been hydrolyzed.

EXAMPLE V

A 1 mole portion of sorbitol is added to a vessel equipped with an agitator. Then, 6 moles of a sulfur trioxide-triethyl phosphate complex prepared in accordance with Example I is added to the vessel over a period of about 1 hour. This level of addition provides for 6 moles of sulfur trioxide per mole of sorbitol or a stoichiometric quantity based on total hydroxyl groups present. Continuous agitation is maintained throughout the addition of the complex and the temperature is maintained at about 35°–40°C. The reaction is allowed to proceed for an additional 10 hours after complete addition of the complex. The resulting product produced is slightly soluble in water but highly soluble in hexane. Less than complete esterification, i.e., sulfoalkylation, of the six hydroxyl groups is obtained with this ratio. Most of those hydroxyl groups not sulfoalkylated are sulfated, however.

When 8 moles of sulfur trioxide-triethyl phosphate is used in place of the 6 moles of sulfur trioxide-triethyl phosphate, substantially complete sulfoalkylation of the six hydroxyl groups is obtained. The resulting product is substantially insoluble in water but is highly soluble in hexane.

EXAMPLE VI

Sulfoalkylated Ester of Polyvinyl Alcohol

A one-half equivalent portion of polyvinyl alcohol having a molecular weight of about 50,000 is added to a vessel equipped with an agitator. Then, dichloroethane is added to the vessel in a proportion of about 100% of the weight of the polyvinyl alcohol. This addition permits dispersion of the polyvinyl alcohol in the dichloroethane carrier. Then, one-half moles of the sulfur trioxide-dicyclohexyl ethyl phosphite complex of Example 2 is added to the vessel in a proportion to give a DS (degree of substitution) of sulfoalkylation of about 0.5. The temperature during the addition is maintained at about 35°–40°C. and the reaction is allowed to proceed for about 10 hours. The resulting ester of polyvinyl alcohol has a low D.S. and is substantially sulfated. When this reaction is repeated using 5 moles of $SO_3$ basis the polyvinyl alcohols, the sulfoalkylated polyvinyl alcohol is obtained.

When the reaction of sulfur trioxide-dicyclohexyl ethyl phosphite is attempted with polyvinyl alcohol in the absence of a carrier such as dichloroethane, little if any reaction occurs. (Polyvinyl alcohol does not swell or is not soluble in the complex.) The product change seems to be negligible.

EXAMPLE VII

Sulfoethylated Cellulose

A cellulosic material suitable for esterification is ground to a fine particle size (about 8 mesh U.S. Standard sieve or finer). An 8 g sample of the ground cellulose is placed in each of 4 containers constituting samples 1, 2, 3, and 4. To these samples are added different portions of a sulfur trioxidetriethyl phosphate complex containing 3.64 moles sulfur trioxide per liter of complex. A 41 ml addition of complex is made to sample 1, a 55 ml addition to sample 2, a 68.7 ml addition to sample 3, and an 82.5 ml addition to sample 4. This level of addition of sulfur trioxide-triethyl phosphate complex resulted in a mole ratio of sulfur trioxide to cellulose of 3, 4, 5, and 6:1 respectively.

The reaction between the sulfur trioxide-triethyl phosphate complex and the 8 g portions of cellulose for each of the samples is allowed to proceed over a 48 hour period. All of the materials in the flasks except sample 1 are in solution. Methylene chloride is added to sample 1 in a 3:1 ratio to reduce the viscosity and the contents are filtered. The methylene chloride in the filtrate is removed by vacuum and then the residue diluted with isopropyl alcohol to precipitate the cellulose trisulfate. Isopropyl alcohol is added to the remaining flasks for precipitating the cellulose trisulfate. All of the precipitates are washed with excess alcohol and dried.

The precipitates are analyzed for free acid, hydrolyzed in boiling water, and again analyzed for free acid. The results are tabulated in Table I below.

percent in excess of the stoichiometric amount needed. A 3:1 mole ratio of sulfur trioxide is the theoretical stoichiometric requirement to effect complete esterification of the cellulose. As the above results show, only 50% of the hydroxyl groups are esterified by this mole ratio and 2.6 hydroxyls on the average are esterified with a 6:1 mole ratio or a 100% excess of that stoichiometrically required for producing the completely esterified product.

The low D.S. ethyl esters are slightly soluble in isopropanol whereas the higher D.S. ethyl esters are not as soluble. All of the esters are quite soluble in hexane. The esters are converted to sulfates by hydrolysis. The resultant cellulose sulfates are soluble at appreciable concentrations in water but not in hexane or other nonpolar solvents. The cellulose sulfates in the acid form are unstable and produce a dark brown to black viscous fluid mass in about 3–5 days.

when the above process is repeated for making cellulose trisulfate and a carrier, namely methylene chloride, is added to the reaction mixture on a basis of 100% by weight of the total composition, very little ester formation is obtained. In fact, the degree of substitution is less than 1.

EXAMPLE VIII

Sodium Cellulose Sulfate

A 1 mole sample or about 162 g of ground cellulose is added to a vessel equipped with an agitator. Then, 1.9 liters of a sulfur trioxide-triethyl phosphate complex containing 6 moles of sulfur trioxide is added to the vessel. The temperature is maintained at about 30°C. and the contents then agitated for about 25 hours. During this period, the ground cellulose dissolves in the triethyl phosphate-sulfur trioxide complex for reaction. After the 28 hour reaction period, 2 liters of methylene chloride is added to the vessel and the contents removed and filtered. A small amount of insoluble material present is removed.

An 800 ml. portion of water is added to the filtrate and the resulting mixture heated for about 20 minutes on a steam bath. This is done to hydrolyze the sulfoethylated ester of cellulose and to remove the methylene chloride in the solution. Solid sodium hydroxide is then added to the mixture raising the pH to about 4. Upon addition of the sodium hydroxide, a precipitate of sodium phosphate is formed. A 1,400 ml. portion of water then is added to the filtrate and the resulting mixture heated for about 20 minutes at 85°C. to insure complete hydrolysis of the sulfoethylated esters. Then a quantity of sodium hydroxide is added to the mixture in a proportion sufficient to raise the pH of the medium

TABLE I

| Sample No. | WT. PPT. | Mol Ratio, $SO_3$: Cel. | Eq. Wt. Before Hydrolysis | Eq. Wt. After Hydrolysis | D.S. of Sulfate | D.S. of Ethyl Ester |
|---|---|---|---|---|---|---|
| 1 | 2.5g | 3:1 | 288 | 132 | 3.0 | 1.46 |
| 2 | 6.0g | 4:1 | 482 | 133 | 3.0 | 2.05 |
| 3 | 7.9g | 5:1 | 502 | 128 | 3.0 | 2.09 |
| 4 | 16.0g | 6:1 | 1239 | 129 | 3.0 | 2.61 |

The calculated equivalent weight of cellulose trisulfate is 134. The highest degree of substitution of ethyl ester is 2.61 or slightly less than the completely esterified cellulose. Although the hydroxyl groups are completely sulfated as indicated by a D.S. of 3, it is believed that completely sulfoalkylated esters could be obtained if the mole ratio of sulfur trioxide to cellulose exceeded about 8:1. This level would provide about 150 mole to about 10. This permits formation of the sodium salt of cellulose sulfate. The solution then is treated with charcoal and then diluted with acetone. The mixture then is filtered and 350 g of precipitated product is recovered. The degree of substitution of the cellulose is about 3.0 and is hereby referred to as the cellulose trisulfate-trisodium salt.

The cellulose trisulfate-trisodium salt obtained above is non-metabolizable. In granular form, it is light brown in color, has a salty taste, is hygroscopic, has a bulk density of 0.43 g/cc and has a water solubility of about 40%.

Surprisingly, this cellulose trisulfate-trisodium salt in appearance and in its physical properties has the characteristics of granular sucrose whereas the trisodium salt of cellulose trisulfate produced in accordance with the directions in the literature does not have these same characteristics.

EXAMPLE IX

Alkylation with Sulfoethylated Cellulose

A 1 mole portion of isopropanol is dissolved in 500 ml. dimethyl formamide and then reacted with 1 mole of sodium methoxide. In this reaction, the methanol by-product is formed and is distilled from the reaction medium. In a separate vessel, 190 g of the sulfoethylated cellulose from Example VII having a degree of substitution of ethyl ester of 2.61, an equivalent weight before hydrolysis of 1,239, and an equivalent weight of 129 after hydrolysis is dissolved in 1 liter of dimethyl formamide. The resulting solution then is added to the solution of basic propanol, i.e., the isopropal reacted with sodium methoxide, at a rate so that the temperature in the vessel does not exceed 100°C. After all of the sulfoethylated cellulose and dimethyl formamide is added to the basic propanol, the contents are permitted to reflux for about 1 hour. After refluxing, ethyl propyl ether is distilled from the reaction mixture and recovered. The advantage of using sulfoethylated cellulose as opposed to diethyl sulfate as an alkylating agent is that it is easier to control the reaction temperature and is not as dangerous as diethyl sulfate if spilled because of its low volatility.

EXAMPLE X

Sulfoethylated Cellulose as an Acid Catalyst

A 0.1 mole portion of parabromophenol is dissolved in 500 ml. of benzene containing about 0.1% water. This solution then is added to a vessel which can be closed or sealed from the atmosphere. Then, a 1 g portion of sulfoethylated cellulose identical to that employed in Example IX is added to the vessel. A 0.1 mole portion of isobutalene is added to the vessel and the vessel closed. The contents in the vessel are permitted to react at a temperature of about 100°C. for about a period of 1 hour. The composition, namely 2-tertiarybutylparabromophenol is produced.

I claim:

1. A process for sulfoalkylating a polyhydric alcohol which comprises reacting said polyhydric alcohol with a sulfur trioxide-organophosphorus complex represented by the formula:

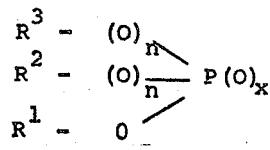

where $R^1$, $R^2$, and $R^3$ are hydrogen or alkyl cycloaliphatic groups containing up to 18 carbon atoms provided that at least one of the groups $R^1$, $R^2$, and $R^3$ is organic, (O) represents oxygen, $n$ is 0 or 1, $x$ is 0 or 1, and P represents phosphorus, said sulfur trioxide being present from 0.1–0.8 moles per mole of organophosphorus compound and said complex being present in a proportion sufficient to provide at least 50 mole percent $SO_3$ in excess of the stoichiometric requirement to form the sulfoalkylated ester, under conditions for forming the sulfoalkylated ester of said polyhydric alcohol.

2. The process of claim 1 wherein said organophosphorus compound is a trialkyl phosphorus ester compound having from 1–18 carbon atoms in the alkyl portion.

3. The process of claim 2 wherein said alkyl portion has from 1–6 carbon atoms.

4. The process of claim 1 wherein said polyhydric alcohol is a polymeric polyhydric alcohol.

5. The process of claim 4 wherein said conditions for reacting said polyhydric alcohol and said complex is from about −20° to about 100°C. and the pressure is atmospheric.

6. The process of claim 5 wherein said complex contains from about 0.25–0.5 moles sulfur trioxide per mole of trialkyl phosphorus compound.

7. The process of claim 5 wherein said trialkyl phosphorus compound is trialkyl phosphate.

8. The process of claim 7 wherein said sulfur trioxide is present in a proportion of from about 100–300% in excess of that required to form said sulfoalkylated ester.

9. The process of claim 8 wherein said polymeric polyhydric alcohol is a polysaccharide.

10. The process of claim 9 wherein said polysaccharide is cellulose, starch, or amylose.

11. The process of claim 10 wherein said polysaccharide is cellulose.

12. The process of claim 11 wherein said sulfoalkylated cellulose ester has a degree of substitution of at least 2.

13. The process of claim 4 wherein said polymeric polyhydric alcohol is polyvinyl alcohol.

14. A sulfoalkylated polymeric polyhydric alcohol of the formula:

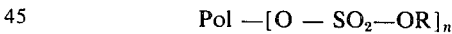

wherein Pol represents a polyhydric alcohol radical, and R represents an alkyl or cycloaliphatic group having up to 18 carbon atoms and $n$ is a number up to the number of hydroxy groups available for esterification.

15. The compound of claim 14 wherein said polymeric alcohol portion is a polysaccharide.

16. The compound of claim 15 wherein said polysaccharide is cellulose.

17. The compound of claim 16 wherein said sulfoalkylated cellulose has a degree of substitution of at least 2.

18. The sulfoalkylated cellulose of claim 17 which has been hydrolyzed.

19. An alkali metal sulfate salt of the compound of claim 18.

20. A compound as defined in claim 19 wherein said alkali metal is sodium.

* * * * *